(12) United States Patent
Pancurák et al.

(10) Patent No.: US 8,715,469 B2
(45) Date of Patent: *May 6, 2014

(54) DISK DEVICE FOR GALVANIC PROCESSING OF DRINKING WATER

(76) Inventors: František Pancurák, Prešov (SK); Ladislav Jurec, Prešov (SK)

( * ) Notice: Subject to any disclaimer, the term of this patent is extended or adjusted under 35 U.S.C. 154(b) by 28 days.

This patent is subject to a terminal disclaimer.

(21) Appl. No.: 13/207,573

(22) Filed: Aug. 11, 2011

(65) Prior Publication Data

US 2012/0037497 A1 Feb. 16, 2012

(30) Foreign Application Priority Data

Aug. 11, 2010 (SK) ...................................... 86-2010

(51) Int. Cl.
*C02F 1/461* (2006.01)

(52) U.S. Cl.
CPC ......... *C02F 1/46176* (2013.01); *C02F 1/46109* (2013.01)
USPC ............ 204/248; 204/212; 204/289; 205/745

(58) Field of Classification Search
CPC ............. C02F 1/46176; C02F 1/46104; C02F 1/46109; C02F 2001/46104; C02F 2001/46109; C02F 2001/46123; C02F 2001/46152; C25B 11/02; C25B 9/125
USPC .......... 204/248, 289, 669, 212; 205/742–761
See application file for complete search history.

(56) References Cited

U.S. PATENT DOCUMENTS

| | | | |
|---|---|---|---|
| 540,608 | A | 6/1895 | Collier et al. |
| 547,710 | A | 10/1895 | Cassard |
| 866,618 | A | 9/1907 | Brannon |
| 2,424,145 | A | 7/1947 | Butler |
| 2,451,067 | A | 10/1948 | Butler |
| 2,548,584 | A | 4/1951 | Briggs |
| 2,670,327 | A | 2/1954 | Rader |
| 2,754,260 | A | 7/1956 | Butler |
| 2,930,568 | A * | 3/1960 | Rader ...................... 204/196.15 |
| 2,974,747 | A | 3/1961 | Coolidge, Jr. et al. |
| 3,026,259 | A | 3/1962 | Phillips |
| 3,286,922 | A | 11/1966 | Franz |
| 3,392,102 | A | 7/1968 | Koch |
| 3,728,245 | A | 4/1973 | Preis et al. |
| 3,974,071 | A | 8/1976 | Dunn et al. |
| 4,749,457 | A * | 6/1988 | Yasuda et al. ................. 205/745 |
| 4,769,120 | A | 9/1988 | Chak |
| 5,814,227 | A | 9/1998 | Pavlis |
| 6,264,837 | B1 | 7/2001 | Marsden |
| 6,605,212 | B2 | 8/2003 | Marsden |
| 6,663,783 | B2 | 12/2003 | Stephenson et al. |
| 6,689,270 | B1 | 2/2004 | Evert |

(Continued)

FOREIGN PATENT DOCUMENTS

UA 61 317 12/2002

*Primary Examiner* — Nicholas A Smith
*Assistant Examiner* — Ciel Thomas
(74) *Attorney, Agent, or Firm* — Greer Burns & Crain, Ltd.

(57) ABSTRACT

An improved galvanic processing device includes disk shaped electrodes made from a metal which have circumferential segments aligned at an angle α relative to the plane of the circumference of the electrode. The circumferential segments may have portions aligned at a different angle β relative to the plane of the circumference of the electrode.

20 Claims, 2 Drawing Sheets

(56) References Cited

U.S. PATENT DOCUMENTS

| | | | |
|---|---|---|---|
| 7,084,548 B1* | 8/2006 | Gabrys | 310/268 |
| 2001/0020598 A1* | 9/2001 | Marsden | 210/199 |
| 2002/0036172 A1* | 3/2002 | Del Signore | 210/748 |
| 2007/0048199 A1* | 3/2007 | Lee | 422/186.04 |
| 2009/0038961 A1* | 2/2009 | Denton et al. | 205/746 |

* cited by examiner

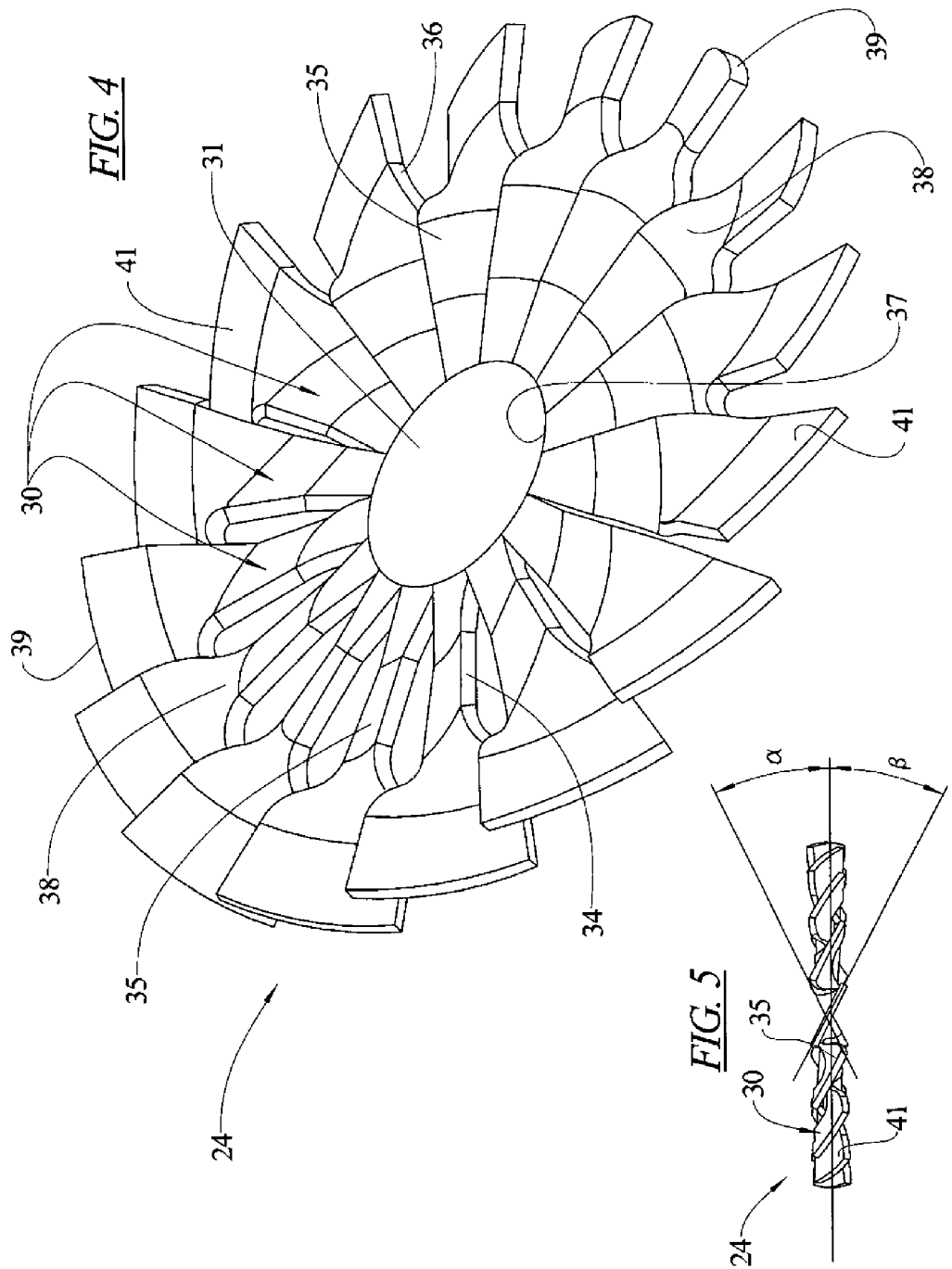

DISK DEVICE FOR GALVANIC PROCESSING OF DRINKING WATER

FIELD OF THE INVENTION

This invention relates to galvanic processing of drinking water. More specifically, it relates to a disk device that changes the ion composition of liquids and especially drinking water by galvanic action between two dissimilar metals.

BACKGROUND OF THE INVENTION

Differences in electrical potential of various ions in aqueous solutions are well documented. These differences are exploited in a galvanic cell. In galvanic cells, two dissimilar metals act as the anode and cathode of an electrolytic cell. At the anode, electrons are withdrawn from the metal atoms and the resulting positive ions enter the electrolyte. Positive ions are combined with the electrons at the cathode, causing atoms to deposit there. By appropriate selection of the cathode and anode, certain ions present in the electrolyte can be made to deposit on the cathode, while the ions entering the electrolyte at the anode remain in the electrolytic medium.

In addition to removing the ions that plate out on the cathode, removal of one or more of the ions can cause other changes in the ions present in the electrolyte due to changes in the chemical equilibrium. Decrease in the concentration of a particular cation potentially leads to an excess in the associated anion. The excess anion may combine with another cation which causes precipitation of the compound because it was less soluble than the original compounds. Where a large number of ionic compounds are present, this can have a "domino" effect, leading to rearranging of a number of the ions. Some of the resulting compounds may be more soluble in the electrolyte and never plate out. Others may precipitate immediately under controlled conditions.

Water that is slightly alkaline has been found to be more activated than water having a neutral pH.

Activated fluids have better bio-energetic and information properties: first of all, it is the hydrogen exponent balance and the pH quantity. Further properties include the informative quantities of specific electric conductivity measured in $\mu S$, the total concentration of electrically neutral soluble ingredients measured in mg/l, and the oxidation reduction potential measured in mV.

The generation of turbulences and vortices in a moving liquid to result in a change in the bioenergetic properties of the liquid was studied and discussed by Viktor Schauberger and is described in several books and internet sites, including "Living Water"—Viktor Schauberger and the Secrets of Natural Energy by Olof Alexandersson (1976) and http://www.pks.or.at/menu_en.html. Viktor Schauberger described the effect caused by turbulences and vortices to be a "vitalizing" effect, which term is used herein.

SUMMARY OF THE INVENTION

The invention is an improved galvanic processing device that comprises a disk-shaped electrode made from a metal, the electrode having circumferential segments aligned at an angle $\alpha$ relative to the plane of the circumference of the electrode. The electrode may be used in an assembled device comprising one or more anodes (one form of the disk-shaped electrode) that are made from a first metal. The assembled device also includes one or more cathodes (another form of the disk-shaped electrode) made from a second metal that is different from the first metal. The cathodes and anodes may be alternately placed substantially parallel to one another and non-conducting spacer rings may separate each of the anodes and the cathodes from each other. The galvanic action of the different metals results in an activation of the liquid, such as water.

In an embodiment of the invention, each disk has a central hub substantially uncut to which said circumferential segments are attached.

In an embodiment, each hub is substantially circular.

In an embodiment, each of the circumferential segments is formed integrally with the hub.

In an embodiment, each electrode has at least 4 circumferential segments.

In an embodiment, each electrode has a bend in each segment resulting in a portion of each segment to be aligned at an angle $\beta$ relative to the plane of the circumference of the electrode, which angle $\beta$ is different than angle $\alpha$.

In an embodiment, the angle $\alpha$ is in the range between 15° and 75° and the angle $\beta$ is in the range between −15° and −75° relative to the plane of the disk.

In an embodiment, the galvanic processing device may be arranged such that the electrodes remain stationary and the fluid is directed in a flow past the stationary electrodes to result in a swirling flow of the fluid.

In an embodiment, the galvanic processing device may be arranged such that the electrodes are rotated and the fluid is stationary, other than a swirling movement imparted to the fluid by the rotating electrodes.

The physical effect of the swirling and turbulences created in the fluid by the electrodes provides a vitalizing effect on the liquid.

Activated and vitalized fluids have better bio-energetic and information properties: first of all, it is the hydrogen exponent balance and the pH quantity. Further properties include the informative quantities of specific electric conductivity measured in $\mu S$, the total concentration of electrically neutral soluble ingredients measured in mg/l, and the oxidation reduction potential measured in mV.

The galvanic processing device of the present invention can be used in small scale applications, such as in bottles and other small containers and can be used in large scale applications such as pipelines and large reservoirs.

BRIEF DESCRIPTION OF THE DRAWINGS

FIG. 4 is a perspective elevation view of a second embodiment of an electrode;

FIG. 5 is a side view of the electrode of FIG. 4.

DETAILED DESCRIPTION OF THE INVENTION

The present invention is directed to the electrode components of a galvanic processing device having two electrodes, an anode and a cathode, as well as a housing or flow container to guide a flow of liquid over the electrodes and to space the electrodes away from one another to generate a galvanic action in the liquid. The galvanic processing device is more particularly described in co-pending patent application Ser. No. 13/207,579, which is incorporated herein in its entirety by reference. A liquid container, including a galvanic processing device, with electrodes such as disclosed herein, is more particularly described in co-pending patent application Ser. No. 13/207,601, which is incorporated herein in its entirety by reference.

Figure 1:
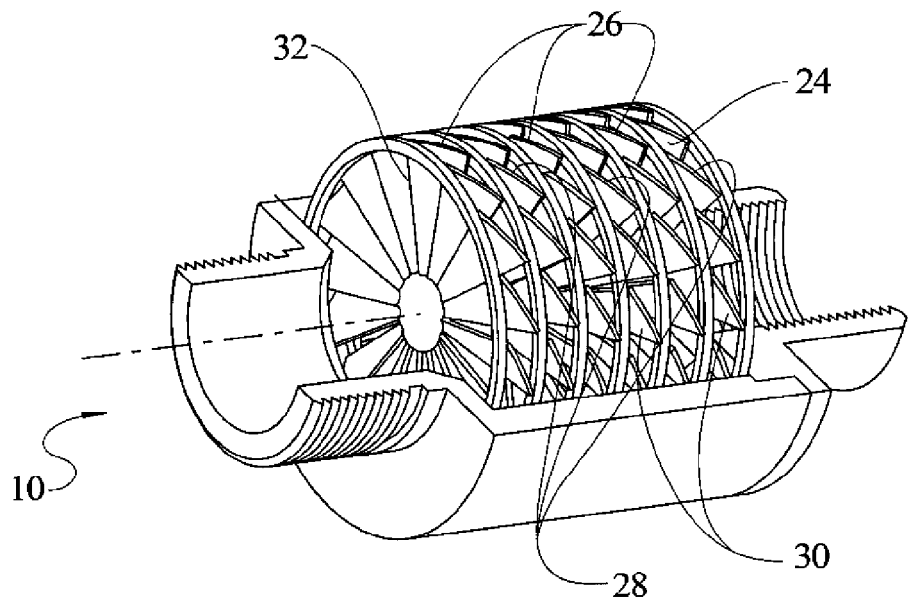
FIG. 1 is a perspective drawing of a galvanic processing device with a portion of the device cut away.
Figure 2:
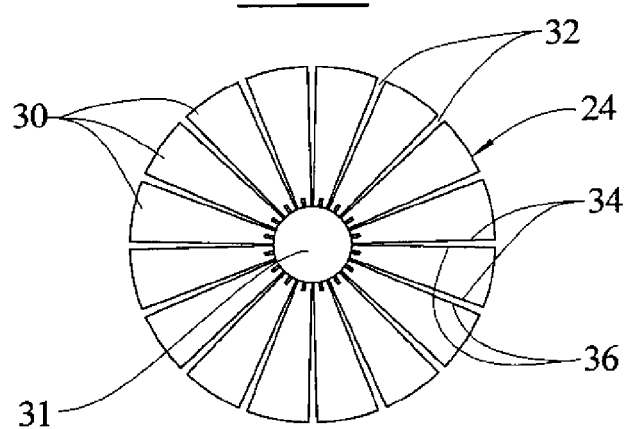
FIG. 2 is a top view of an electrode within the processing device of FIG. 1.
Figure 3:
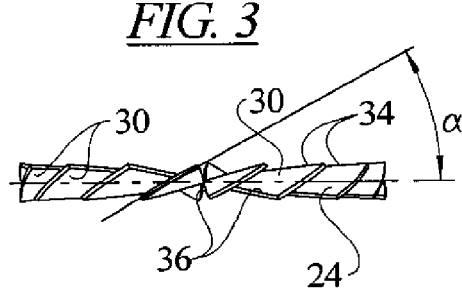
FIG. 3 is a side view of the electrode of FIG. 2.

Referring to FIGS. 2 and 3, an electrode 24 is shown which may comprise one of an anode 26 or a cathode 28. The electrodes 24 may be used in a galvanic processing device 10 as shown in FIG. 1.

In the galvanic processing device 10, there is at least one first electrode 24 made from a first metal, and at least one second electrode 24 made from a second metal different from the first metal. The first electrode 24 is preferably disk-shaped and has a plurality of circumferential segments 30 aligned at an angle α relative to the plane of the circumference of the first electrode. The second electrode 24 is also preferably disk-shaped and has a plurality of circumferential segments 30 aligned at an angle α relative to the plane of the circumference of the second electrode. The first electrodes 24 and the second electrodes 24 may be alternately arranged substantially parallel to one another in the galvanic processing device 10 as shown in FIG. 1.

Any metals can be used for the electrodes 24 as long as the first metal and the second metal are dissimilar, especially with respect to their electronegativity, and have distinctive conductive capacities. Galvanic activity of various metals is well known. The first metal is the metal having the higher galvanic activity and will become an anode 26. Less active second metals act as a cathode 28. Examples of preferred anodes 26 are zinc and aluminum. Preferred cathodes 28 are exemplified by copper, brass, stainless steel and carbon. In some embodiments, combinations of useful anodes 26 and cathodes 28 are zinc-copper, zinc-brass, zinc-stainless steel, aluminum-copper, aluminum-brass and zinc-carbon.

Electrodes 24 of any shape are useful in the device 10, however, in preferred embodiments they substantially have the shape of a disk. The circular cross-section of the electrode disk 24 improves the ratio of the surface area which contacts a fluid directed over the electrode compared to the volume of the electrode. Thickness of the electrode disk 24 should be reduced to reduce bulk of the device and because additional thickness makes a negligible contribution to the surface in contact with the moving fluid.

Turning again to FIGS. 2-4, each of the electrodes 24 has circumferential segments 30 originating near the center of the electrode. Each disk has a central hub 31 substantially uncut, to which the circumferential segments 30 are attached. In a preferred embodiment, each hub 31 is substantially circular. Each of the electrodes has at least 4 circumferential segments 30 and may have up to 16 segments (as shown), or more.

The circumferential segments 30 are preferably formed integrally with the hub 31. Radial slits 32 divide the electrode 24 into a plurality of circumferential segments 30 each having a leading edge 34 and a trailing edge 36. Each circumferential segment 30 is narrower at the hub 31 and wider at the circumference free end. Each circumferential segment 30 is optionally substantially planar along its length and rotated around its longitudinal axis near a point 37 where the segment joins the hub 31 so that the leading edge 34 of an arm 35 the segment is axially displaced (along the axis of the disk which is perpendicular to the plane of the disk) relative to the trailing edge 36 of the arm of an adjacent circumferential segment. In a first embodiment shown in FIG. 3, the circumferential segments 30 of all of the electrodes 24 have the leading edge 34 displaced upwardly at an angle α while the trailing edge 36 is displaced downwardly at the same angle. In preferred embodiments, α varies between 15° and 75° relative to the plane of the disk. Displacement of each leading edge 34 in the same direction channels the fluid to flow in a spiral between adjacent electrodes 24. This improves contact between the fluid and the electrodes 24, and reduces the amount of fluid that stagnates near the circumference of the electrodes. The spiral swirling of the fluid also has a vitalizing effect on the fluid.

The circumferential segment 30 is optionally bent in another direction at a second location 38 at an angle β, also within the range of 15° to 75°, close to the end of the segment opposite the free end 39 of the electrode as shown in the embodiment of FIGS. 4 and 5. The second location bend 38 results in a distal tab 41 that is angled differently than the angle of the arm 35 of each segment 30. This different angle causes a change in the direction of the fluid flow along the radial length of the segments 30, and may cause some overall turbulence in the fluid flow, particularly if the difference in the angles is large. In an embodiment, the angle β may be in an opposite direction relative to the angle α and in comparison to the plane of the disk (as shown in FIG. 5) which causes a reversal of fluid flow in the radial outer regions of the disk, generating turbulence and enhancing the activation and vitalizing effects on the fluid flowing across the electrodes. For example, the angle α may be in the range between 15° and 75° and the angle β may be in the range between −15° and −75° relative to the plane of the disk.

While particular embodiments of the galvanic processing device for water have been shown and described, it will be appreciated by those skilled in the art that changes and modifications may be made thereto without departing from the invention in its broader aspects and as set forth in the following claims.

What is claimed is:

1. A galvanic processing device comprising:
   a disk-shaped electrode made from a metal, said electrode having a central hub and a plurality of circumferential segments that extend from said central hub, wherein said circumferential segments are aligned at an angle α relative to the plane of the circumference of the electrode, and
   further wherein said central hub lacks an aperture therein.

2. The device of claim 1 wherein said metal is selected from the group consisting of zinc and aluminum.

3. The device of claim 1 wherein said metal is selected from the group consisting of stainless steel, copper, brass and carbon.

4. The device of claim 1 wherein the angle α is between 15° and 75°.

5. The device of claim 1 wherein said central hub is substantially uncut.

6. The device of claim 1 wherein said hub is substantially circular, and slits separating said circumferential segments from each other extend to an outer periphery of said substantially circular central hub.

7. The device of claim 1 wherein each of said circumferential segments is formed integrally with said central hub.

8. The device of claim 1 wherein each of said electrodes has at least four of said circumferential segments.

9. The device of claim 1 further including a bend in each of said circumferential segments resulting in a portion of each of said circumferential segments being aligned at an angle β relative to the plane of the circumference of the electrode.

10. A galvanic processing device comprising:
    a disk-shaped electrode made from a metal, said electrode having a central hub and a plurality of circumferential segments that extend from said central hub, wherein said circumferential segments are aligned at an angle α relative to the plane of the circumference of the electrode, wherein said central hub lacks an aperture therein, wherein each of said circumferential segments includes a bend therein, resulting in a portion of each of said circumferential segments being aligned at an angle β relative to the plane of the circumference of the electrode, and further wherein the angle α is in the range between 15° and 75° and the angle β is in the range between −15° and −75° relative to the plane of the disk.

11. A galvanic processing device comprising:
at least one first electrode made from a first metal, said first electrode being disk-shaped and having circumferential segments aligned at an angle α relative to the plane of the circumference of the first electrode;
at least one second electrode made from a second metal different from said first metal, said second electrode being disk-shaped and having circumferential segments aligned at an angle α relative to the plane of the circumference of the second electrode;
said first electrode and said second electrode being alternately arranged substantially parallel to one another along an imaginary axis extending through each of said disk-shaped electrodes; and
a non-conducting spacer ring positioned to separate said first electrode from said second electrode,
wherein each of said first and second electrodes has at least four circumferential segments, and further wherein each of said first and second electrodes is of the same configuration except for the material thereof; and
wherein each of said first and second electrodes has a central hub substantially uncut to which said circumferential segments are attached, and further wherein said central hub lacks an aperture therein.

12. The device of claim 11 wherein said first metal is selected from the group consisting of zinc and aluminum, and wherein said second metal is selected from the group consisting of stainless steel, copper, brass and carbon,
whereby galvanic action is generated between said first electrodes and said second electrode when immersed in a liquid.

13. The device of claim 12 wherein said non-conducting spacer ring is positioned at outer peripheries of said first and second electrodes.

14. The device of claim 11 wherein the angle α is between 1° and 90°.

15. The device of claim 11 wherein each central hub is substantially circular.

16. The device of claim 11 wherein each of said circumferential segments is formed integrally with said central hub.

17. The device of claim 11 further including a bend in each segment resulting in a portion of each segment to be aligned at an angle β relative to the plane of the circumference of the electrode.

18. The device of claim 17 wherein the angle α is in the range between 15° and 75° and the angle β is in the range between −15° and −75° relative to the plane of the disk.

19. The device of claim 11 wherein said galvanic processing device is arranged in a stationary manner in a flow of fluid.

20. The device of claim 11 wherein said galvanic processing device is arranged to rotate about said axis in a relatively stationary fluid body.

* * * * *